(12) United States Patent
Dickgiesser et al.

(10) Patent No.: US 10,838,847 B2
(45) Date of Patent: Nov. 17, 2020

(54) INTEGRATED SOFTWARE TESTING AND DEPLOYMENT TRACKER

(71) Applicant: SAP SE, Walldorf (DE)

(72) Inventors: Klaus Dickgiesser, Karlsruhe (DE); Andreas Loebel, Kronau (DE)

(73) Assignee: SAP SE, Walldorf (DE)

( * ) Notice: Subject to any disclaimer, the term of this patent is extended or adjusted under 35 U.S.C. 154(b) by 106 days.

(21) Appl. No.: 15/686,751

(22) Filed: Aug. 25, 2017

(65) Prior Publication Data

US 2019/0065342 A1 Feb. 28, 2019

(51) Int. Cl.
*G06F 11/36* (2006.01)
*G06F 8/658* (2018.01)
*G06F 8/71* (2018.01)

(52) U.S. Cl.
CPC ............ *G06F 11/368* (2013.01); *G06F 8/658* (2018.02); *G06F 8/71* (2013.01); *G06F 11/3684* (2013.01); *G06F 11/3688* (2013.01); *G06F 11/3676* (2013.01)

(58) Field of Classification Search
CPC ............... G06F 11/368; G06F 11/3676; G06F 11/3684; G06F 8/658; G06F 11/36; G06F 8/71; G06F 11/3688
See application file for complete search history.

(56) References Cited

U.S. PATENT DOCUMENTS

| | | | | |
|---|---|---|---|---|
| 6,662,363 B1* | 12/2003 | Miyamoto | ................ | G06F 8/61 717/168 |
| 6,748,582 B1* | 6/2004 | Chiles | ....................... | G06F 8/30 717/101 |
| 8,037,453 B1* | 10/2011 | Zawadzki | ................ | G06F 8/71 717/123 |
| 9,645,808 B1* | 5/2017 | Turpie | ...................... | G06F 8/65 |
| 10,678,666 B1* | 6/2020 | Gauf | .................... | G06F 11/2635 |
| 2003/0066048 A1* | 4/2003 | Kumhyr | .................... | G06F 8/71 717/101 |
| 2003/0167422 A1* | 9/2003 | Morrison | ............. | G06F 11/3672 714/38.14 |
| 2004/0060044 A1* | 3/2004 | Das | ........................... | G06F 8/65 717/171 |
| 2009/0199160 A1* | 8/2009 | Vaitheeswaran | .... | G06F 11/3414 717/124 |
| 2009/0260004 A1* | 10/2009 | Datta | ....................... | G06F 8/65 717/175 |

(Continued)

*Primary Examiner* — Ziaul A Chowdhury
(74) *Attorney, Agent, or Firm* — Mintz Levin Cohn Ferris Glovsky and Popeo, P.C.

(57) ABSTRACT

A method may include generating a first tracking object corresponding to at least one change to a software product. The at least one change may be a part of a first update to the software product. The at least one change may have an implementation that requires a completion of a task associated with a second tracking object at another system. The second tracking object may be configured to at least determine when the task is complete. An indication that the task is complete may be received from the second tracking object. In response to receiving the indication, the first tracking object may test the at least one change. In response to the at least one change failing to pass the testing, the second tracking object may be added to a third tracking object associated with a second update to the software product.

15 Claims, 5 Drawing Sheets

(56) References Cited

U.S. PATENT DOCUMENTS

| | | | |
|---|---|---|---|
| 2012/0209818 A1* | 8/2012 | Richter | G06F 16/2365 |
| | | | 707/690 |
| 2012/0222014 A1* | 8/2012 | Peretz | G06F 11/3684 |
| | | | 717/125 |
| 2014/0053125 A1* | 2/2014 | DeLuca | G06Q 10/06398 |
| | | | 717/101 |
| 2014/0245264 A1* | 8/2014 | Bartley | G06F 8/70 |
| | | | 717/124 |
| 2015/0154097 A1* | 6/2015 | Duda | G06F 11/3664 |
| | | | 714/38.1 |
| 2015/0248280 A1* | 9/2015 | Pillay | G06F 8/65 |
| | | | 717/106 |
| 2015/0324723 A1* | 11/2015 | Ben-Yehuda | G06Q 10/06316 |
| | | | 717/101 |
| 2016/0062876 A1* | 3/2016 | Narayanan | G06F 11/3684 |
| | | | 717/130 |
| 2016/0364210 A1* | 12/2016 | Davidov | G06F 8/20 |
| 2017/0060560 A1* | 3/2017 | Kumar | G06F 8/65 |
| 2017/0083290 A1* | 3/2017 | Bharthulwar | G06F 8/20 |
| 2018/0024193 A1* | 1/2018 | Kumar | G01R 31/31715 |
| | | | 714/734 |
| 2018/0046455 A1* | 2/2018 | Walsh | G06F 8/71 |
| 2018/0121333 A1* | 5/2018 | Richter | G06F 11/3692 |
| 2018/0136930 A1* | 5/2018 | Saxena | G06F 8/65 |
| 2018/0365133 A1* | 12/2018 | Mitchell | G06F 11/3688 |
| 2020/0125485 A1* | 4/2020 | Wiener | G06F 8/71 |

\* cited by examiner ically to
INTEGRATED SOFTWARE TESTING AND DEPLOYMENT TRACKER

TECHNICAL FIELD

The subject matter described herein relates generally to software development and more specifically to tracking development lifecycle of a software program across multiple platforms.

BACKGROUND

The development lifecycle of a software product and/or updates to the software product may include a sequence of stages including, for example, development, testing, acceptance, production, and/or the like. For instance, the software product may be developed on a development system before undergoing testing in a test environment that closely mimics an end user's target environment. The software product may subsequently be released to an acceptance test environment for testing by the end user. If the end user accepts the product, then the product may be deployed into a production environment where it becomes available for use.

SUMMARY

Systems, methods, and articles of manufacture, including computer program products, are provided for tracking software testing and deployment. In one aspect, there is provided a system. The system may include at least one data processor and at least one memory. The at least one memory may store instructions that cause operations when executed by the at least one data processor. The operations may include: generating a first tracking object corresponding to at least one change to a software product, the at least one change being a part of a first update to the software product, the at least one change having an implementation that requires a completion of a task associated with a second tracking object at another system, and the second tracking object being configured to at least determine when the task is complete; receiving, from the second tracking object, an indication that the task is complete; in response to receiving the indication, testing, by the first tracking object, the at least one change; and in response to the at least one change failing to pass the testing, adding the second tracking object to a third tracking object associated with a second update to the software product.

In some variations, one or more features disclosed herein including the following features can optionally be included in any feasible combination. In response to the at least one change successfully passing the testing, the first tracking object may deploy the at least one change to a production system. The addition of the second tracking object to the third tracking object may at least enable the task associated with the second tracking object to be performed a second time.

In some variations, the first tracking object may be associated with a fourth tracking object corresponding to a feature of the first update to the software product. An implementation of the feature may require the completion of the task associated the second tracking object. The fourth tracking object may be associated with a fifth tracking object at the other system. The fifth tracking object may correspond to a task log that includes the task. The second tracking object may be associated with the fifth tracking object. The second tracking object may be further configured to send, to the fifth tracking object, an indication of when the task is complete. The fifth tracking object may be configured to at least: determine, based at least on the indication from the second tracking object, when every task included in the task log corresponding to the fifth tracking object is complete; and in response to a determination that every task included in the task log is complete, send, to the fourth tracking object, an indication that the feature corresponding to the fourth tracking object has been implemented.

In some variations, the testing of the at least one change may include applying a test package associated with the at least one change. The test package may include one or more tests implemented by one or more corresponding test scripts. The change may pass the testing by passing a threshold quantity of the one or more tests. The first tracking object, the second tracking object, and/or the third tracking object may be running processes.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Updating an existing software product may require the collaborative efforts of both software developers and end users. For example, an end user may determine the specifications for a software update and further task a software developer with creating the software update in accordance with the specification. Once the software developer creates the software update, the end user may run a battery of tests before the software update can be released into a production environment. In some example embodiments, a tracking engine may be configured to track and coordinate the progress of the software update through its development lifecycle. The tracking engine may include separate trackers that allow the software developer and the end user to individually track the progress of the software update through one or more stages of the development lifecycle. For instance, the software developer may be associated with a development tracker while the end user may be associated with a deployment tracker. The development tracker may interact with the deployment tracker in order to coordinate the development and the testing of the software update up through its release into a production environment.

Figure 1:
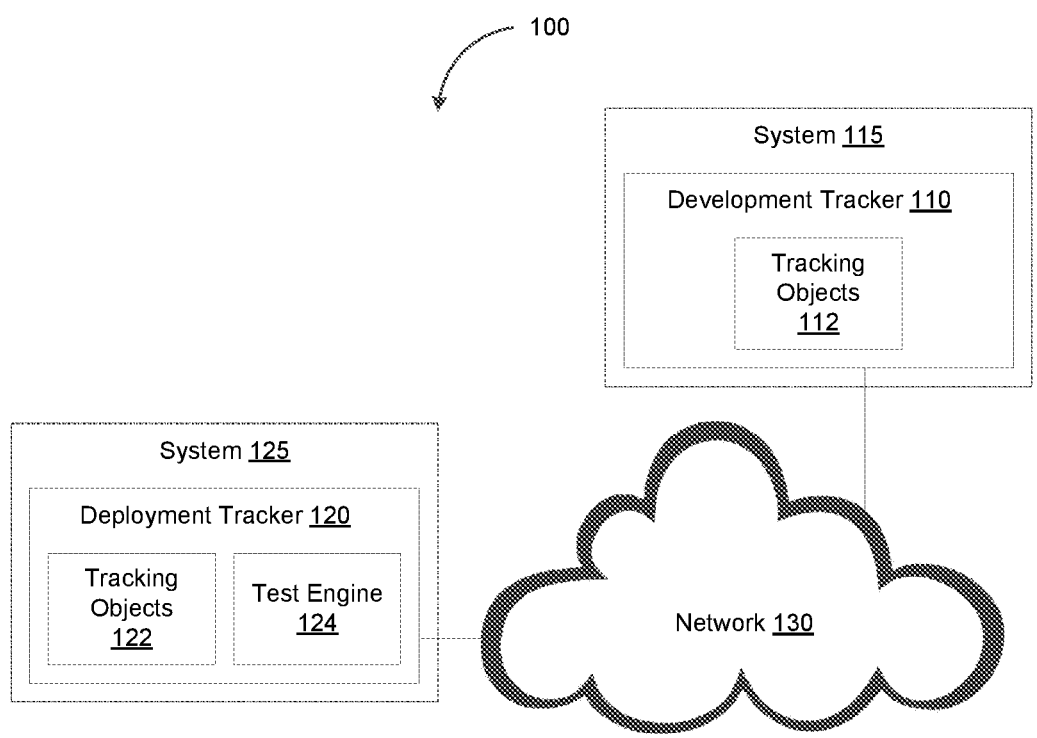
FIG. 1 depicts a system diagram illustrating a tracking engine, in accordance with some example embodiments.

FIG. 1 depicts a system diagram illustrating a tracking engine 100, in accordance with some example embodiments. Referring to FIG. 1, the tracking engine 110 may include a plurality of trackers, which may be deployed across different remote systems. For instance, as shown in FIG. 1, the tracking engine 110 may include a development tracker 110 and a deployment tracker 120. The development tracker 110 may be deployed at a first system 115, which may be associated with a software developer. Meanwhile, the deployment tracker 120 may be deployed at a second system 125, which may be associated with an end user. The first system 115 and/or the second system 125 may be and/or include any type of processor and memory based device, such as, for example, cellular phones, smart phones, tablet computers, laptop computers, desktop computers, workstations, and/or the like. As shown in FIG. 1, the development tracker 110 may be communicatively coupled with the deployment tracker 120 via a network 130. It should be appreciated that the network 130 may be any wired and/or wireless network including, for example, a public land mobile network (PLMN), a local area network (LAN), a wide area network (WAN), the Internet, and/or the like.

In some example embodiments, the development tracker 110 may interact with the deployment tracker 120 in order to coordinate the development and testing of an update to an existing software product. The software update may include one or more features. Furthermore, each feature may require one or more changes to the existing software product. The development of the software update may include implementing these features by at least completing the tasks that are required to effect the changes associated with each feature. According to some example embodiments, the development tracker 110 and the deployment tracker 120 may generate and/or maintain a plurality of hierarchical tracking objects corresponding to the software update as well as its features and required changes. For example, the development tracker 110 may maintain a first plurality of tracking objects 112 and the deployment tracker 120 may maintain a second plurality of tracking objects 122. It should be appreciated that a tracking object may be a running computer process configured to interact with one or more other tracking objects. As used herein, a computer process may be an instance of a computer program that is being executed. For example, a tracking object at the development tracker 110 may interact with a corresponding tracking object at the deployment tracker 120 in order to track, for example, the completion of a task required to realize a change associated with a feature of the software update.

Figure 2:
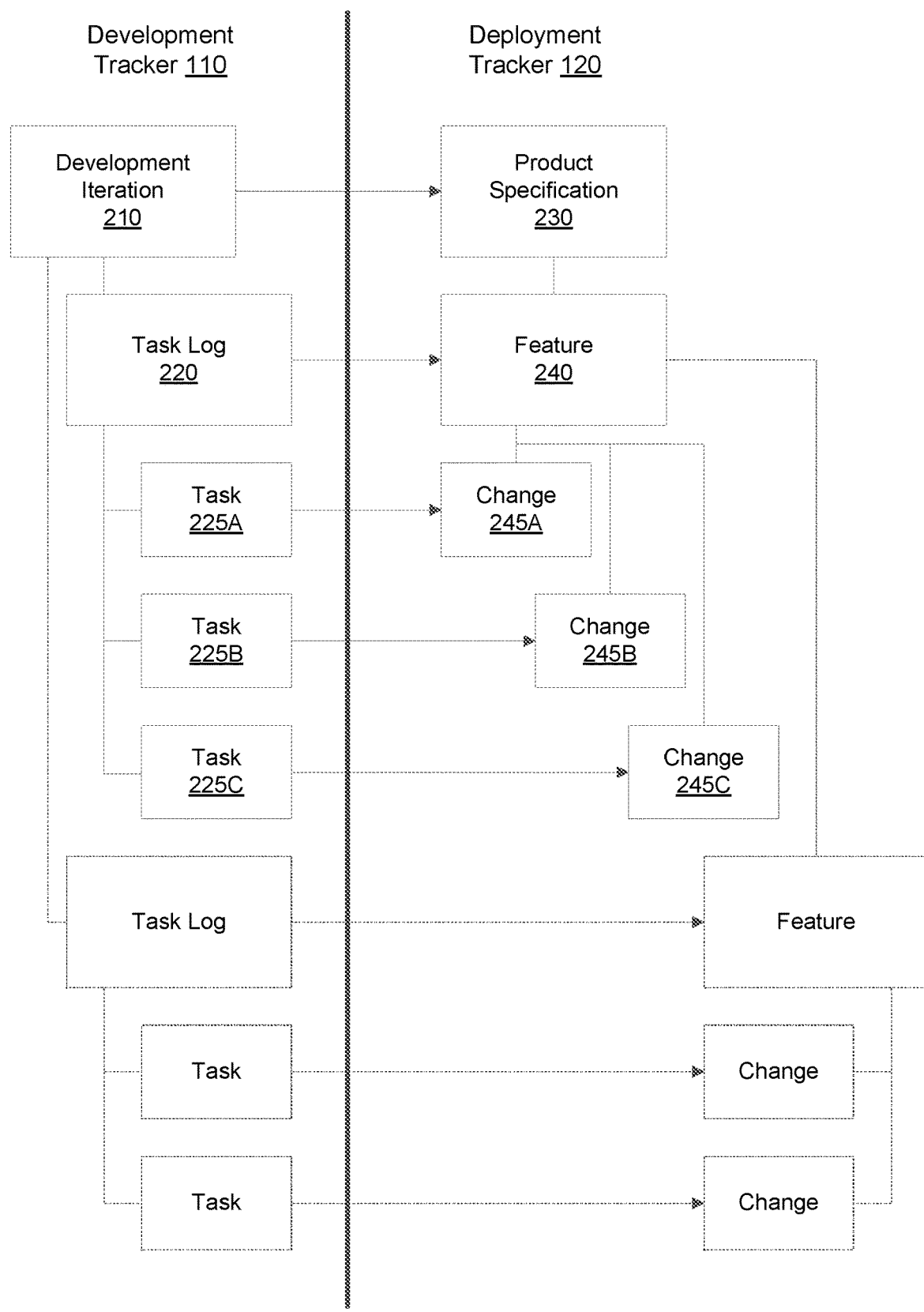
FIG. 2 depicts the interactivity between tracking objects, in accordance with some example embodiments.

To further illustrate, FIG. 2 depicts the interactivity between tracking objects, in accordance with some example embodiments. As shown in FIG. 2, the deployment tracker 120 may maintain a production specification object 230 corresponding to a software update while the development tracker 110 may maintain a corresponding development iteration object 210. It should be appreciated that each development iteration object may correspond to a separate iteration of software update and/or the corresponding updated version of the software product. The product specification object 230 may include a plurality of feature objects corresponding to the features of the software update including, for example, a feature object 240. Furthermore, the feature object 240 may include a plurality of change objects, such as, for example, a first change object 245A, a second change object 245B, and a third change object 245C. The first change object 245A, the second change object 245B, and/or the third change object 245C may correspond to the changes required to implement the feature corresponding to the feature object 240.

Referring again to FIG. 2, the development tracker 110 may maintain a plurality of tracking objects, which may interact with a plurality of corresponding tracking objects maintained by the deployment tracker 120. For example, the development tracker 110 may maintain a development iteration object 210 that interacts with the product specification object 230 at the deployment tracker 120. The development tracker 110 may also maintain a task log object 220, which may interact with the feature object 240 at the deployment tracker 120. Furthermore, the task log object 220 may include a plurality of task objects including, for example, a first task object 225A, a second task object 225B, and a third task object 225C. Each task object may correspond to a task that must be completed, for example, at the first system 115, in order to effect the change associated with a corresponding change object. For instance, the first task object 225A may correspond to a task that must be completed in order to effect the change associated with the first change object 245A. The second task object 225B may correspond to a task that must be completed in order to realize the change associated with the second change object 245B. Alternatively and/or additionally, the third task object 225C may correspond to a task that must be completed in order to realize the change associated with the third change object 245C. As such, the first task object 225A, the second task object 225B, and the third task object 225C may interact, respectively, with the first change object 245A, the second change object 245B, and the third change object 245C.

According to some example embodiments, each tracking object may serve as a progress monitor that reports to one or more other tracking objects. For instance, the first task object 225A may monitor and/or report the progress of the task associated with the first task object 225A. Upon determining that the task associated with the first task object 225A has been completed, the first task object 225A may send, to the corresponding first change object 245A and/or the task log object 220, an indication that the task for effecting the change associated with the first change object 245A has been completed. Meanwhile, the task log object 220 may monitor and/or report the progress at each constituent task objects including, for example, the first task object 225A, the second task object 225B, and the third task object 225C. Upon determining that the task associated with each constituent task object has been completed, the task log object 220 may send, to the feature object 240 and/or the development iteration object 210, an indication that the feature associated with the feature object 240 has been implemented. Alternatively and/or additionally, the development iteration object 210 may monitor and/or report the progress at each constituent task log object including, for example, the task log 220. When the development iteration object 210 determines that the feature associated with each constituent task log has been implemented, the development iteration object 210 may send, to the product specification object 230, an indication that the development of the software update corresponding to the product specification object 230 has concluded.

Figure 3:
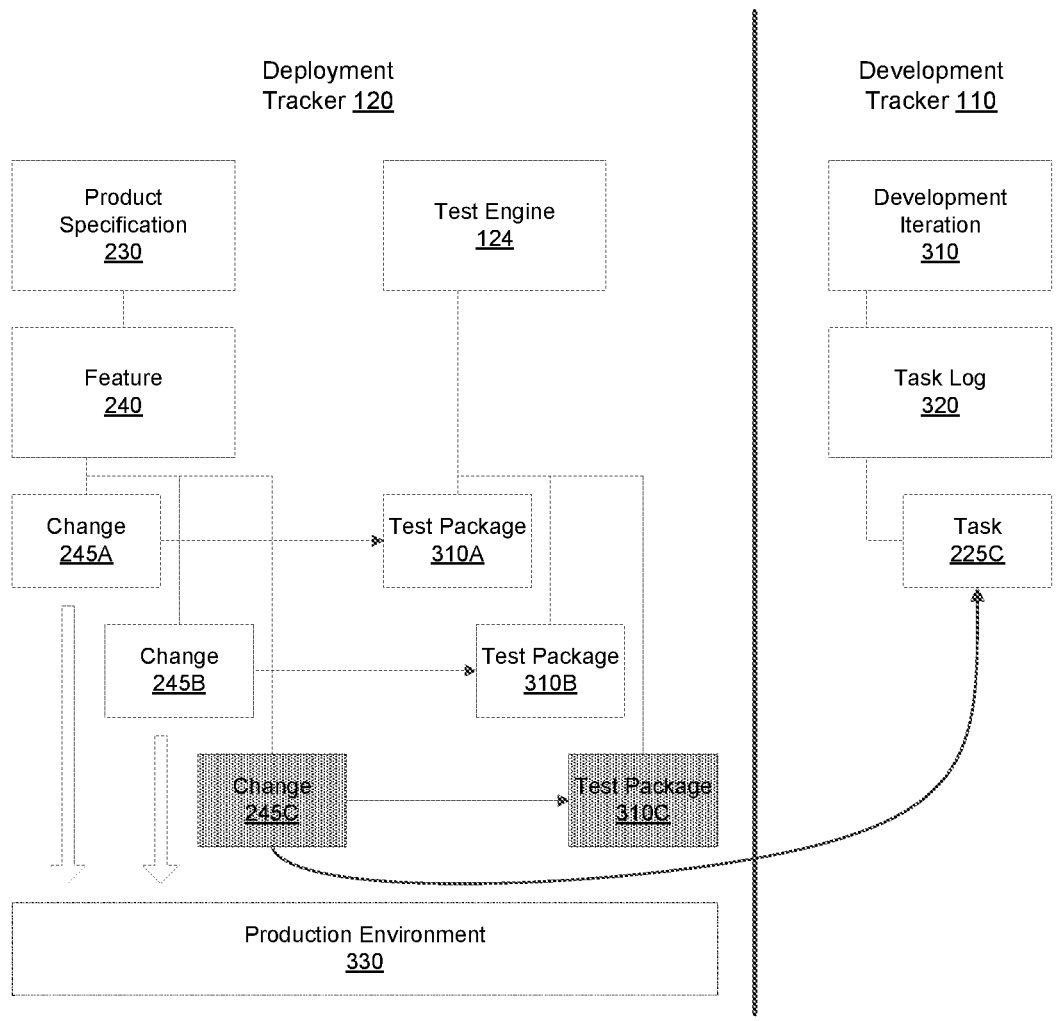
FIG. 3 depicts automated testing and deployment, in accordance with some example embodiments.

In some example embodiments, the deployment tracker 120 may be configured to automate the testing of the software update corresponding to the product specification object 230. For example, the deployment tracker 120 may include a test engine 124 configured to perform incremental testing of each change that is made in order to implement the features of the software update. To further illustrate, FIG. 3 depicts automated testing and deployment, in accordance with some example embodiments. As shown in FIG. 3, the test engine 124 may provide a plurality of test packages including, for example, a first test package 310A, a second test package 310B, and a third test package 310C. Each test package may be configured to test a specific change to the software update and may thus be assigned to a corresponding change object. For example, the first test package 310A may be applied to test the change that is associated with the first change object 245A. The second test package 310B may be applied to test the change associated with the second change object 245B. Alternatively and/or additionally, the third test package 310C may be applied to test the change associated with the third change object 245C.

Each change object may be configured to determine whether the change may be deployed to a production environment 330 based at least on an outcome of the testing. For example, as shown in FIG. 3, the first change object 245A may determine that the corresponding change to the existing software update may be deployed to the production environment 330 based at least on the change successfully passing the tests associated with the first test package 310A. Similarly, the second change object 245B may also determine that the corresponding change to the existing software update may be deployed to the production environment 330 based at least on the change successfully passing the tests associated with the second test package 310B.

In some example embodiments, each test package (e.g., the first test package 310A, the second test package 310B, and/or the third test package 310C) may include one or more tests. For instance, a test package may include one or more test scripts implementing different types of tests including, for example, unit testing, integration testing, functional testing, system testing, stress testing, performance testing, usability testing, acceptance testing, regression testing, beta testing, and/or the like. Testing a change may include executing the one or more test scripts included in the test package associated with the change. To successfully pass testing, the change may be required to pass the individual tests implemented by the test scripts including by, for example, achieving a threshold score. Alternatively and/or additionally, the change may be required to pass at least a threshold quantity of the tests in the test package associated with the change.

In some example embodiments, where a change object determines that the corresponding change did not successfully pass testing, the change object may at least add the corresponding task object to a task log object of a subsequent development iteration object. For example, as shown in FIG. 3, the third change object 245C may determine that its corresponding change did not successfully pass the testing associated with the third test package 310C. As such, the third change object 245C may add the corresponding third task object 225C to a different task log 320 included in another development iteration object 310. The other development iteration object 310 may correspond to a different and/or subsequent software update that the software developer may create. By adding the third task object 225C to the other development iteration object 310, the task associated with the third task object 225C may be performed a second time in an effort to realize the change associated with the third change object 245C. When that task is completed for the second time, the test engine 124 may again subject the resulting change to testing by applying the third test package 310C. It should be appreciated that the third change object 245C may continue to add the third task object 225C to subsequent development iteration objects until that change to the software product successfully undergoes testing and is deployed to the production environment 330.

Figure 4:
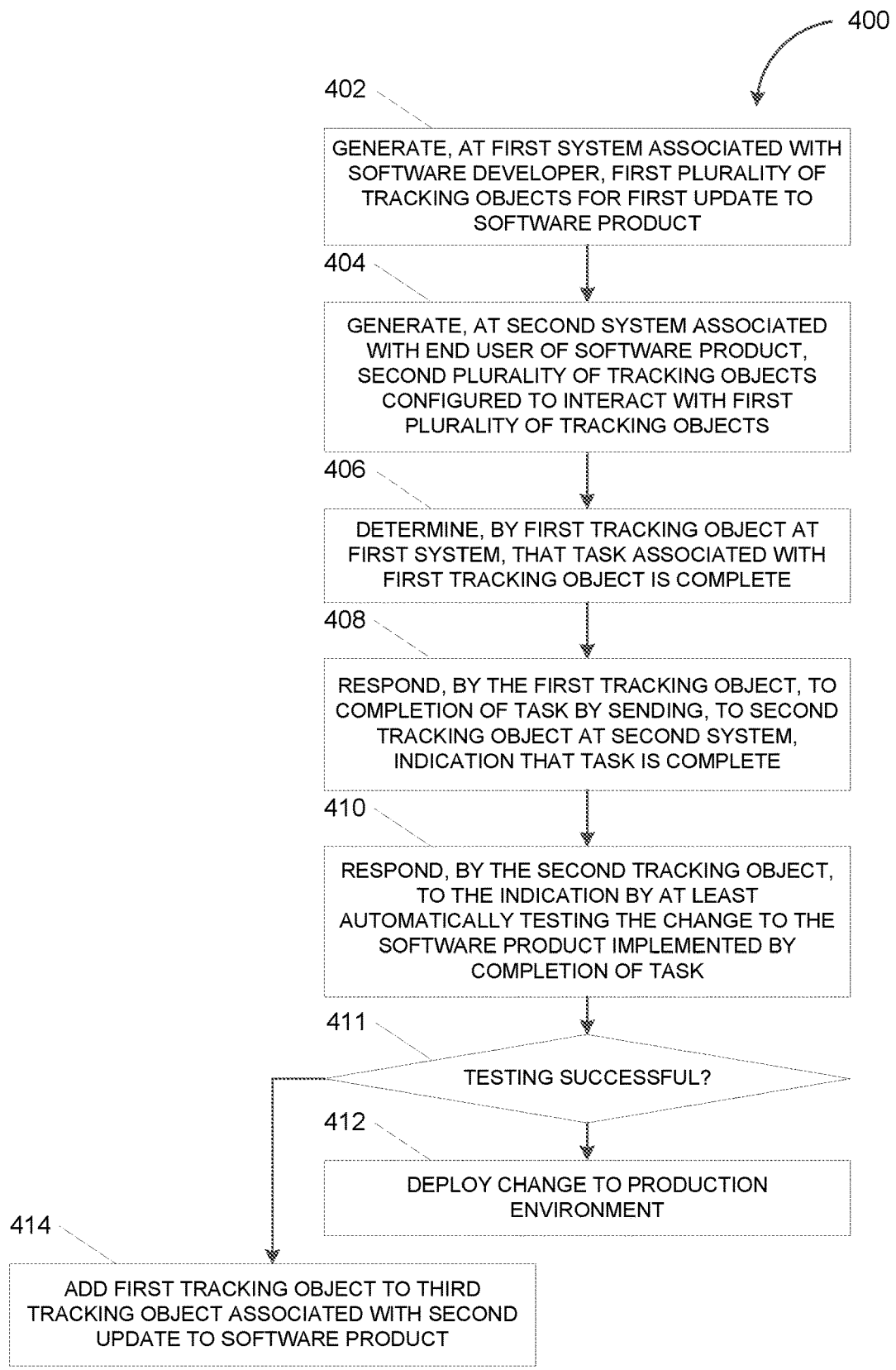
FIG. 4 depicts a flowchart illustrating a process for tracking the development and testing of a software update, in accordance with some example embodiments.

FIG. 4 depicts a flowchart illustrating a process 400 for tracking the development and testing of a software update, in accordance with some example embodiments. Referring to FIGS. 1-4, the process 400 may be performed by the tracking engine 100, for example, by the development tracker 110 and the deployment tracker 120.

At 402, the development tracker 110 may generate, at the first system 115 associated with a software developer, a first plurality of tracking objects for a first update to a software product. For example, as shown in FIG. 1, the development tracker 110 may generate and/or maintain the first plurality of tracking objects 112. Referring to FIG. 2, the first plurality of tracking objects 112 may include the development iteration object 210, the task log object 220, the first task object 225A, the second task object 225B, and the third task object 225C.

At 404, the deployment tracker 120 may generate, at the second system 125 associated with an end user of the software product, a second plurality of tracking objects configured to interact with the first plurality of tracking objects. For example, as shown in FIG. 1, the deployment tracker 120 may generate and/or maintain the second plurality of tracking objects 122. Referring to FIG. 2, the second plurality of tracking objects 124 may include the product specification object 230, the feature object 240, the first change object 245A, the second change object 245B, and the third change object 245C. Each of the first plurality of tracking objects 112 may interact with a corresponding tracking object from the second plurality of tracking objects 124.

At 406, a first tracking object at the first system may determine that a task associated with the first tracking object is complete. For example, the first task object 225A may be configured to monitor and/or report the progress of the task that is associated with the first task object 225A. The task associated with the first task object 225A may be completed in order to effect the change associated with the first change object 245A. Furthermore, the changes associated with the first change object 245A, the second change object 245B, and the third change object 245C may be made in order to implement the feature associated with the feature object 240.

At 408, the first tracking object may respond to the completion of the task by sending, to a second tracking object at the second system, an indication that the task is complete. Meanwhile, at 410, the second tracking object may respond to the indication by at least automatically testing the change to the software product that is implemented by the completion of the task. For instance, in response to determining that the task associated with the first task object 225A is complete, the first task object 225A may send, to the first change object 245C, an indication that the task is complete. The first change object 245C may respond to the indication by applying the first test package 310A At 411, the second tracking object may determine whether the change successfully passes the test. If the change does successfully pass the test at 411-Y, the second tracking object may, at 412, deploy the change to a production environment in response to the change successfully passing the test. Alternatively and/or additionally, As such, at 414, the second tracking object may add the first tracking object to a third tracking object associated with a second update to the software product. For instance, as shown in FIG. 3, the first change object 245A may deploy, to the production environment 330, the change associated with the first change object 245A in response to that change successfully passing the tests associated with the first test package 310A. Similarly, the second change object 245B may also deploy, to the production environment 330, the change associated with the second change object 245B in response to that change successfully passing the tests associated with the second test package 310B. By contrast, the third change object 245C may determine that the change associated with the third change object 245C did not successfully pass the tests associated with the third test package 310C. Accordingly, the third change object 245C may assign the corresponding third task object 225C to the task log 320 included in the other development iteration object 310. Adding the third task object 225C to the other development iteration object 310 may enable the task associated with the third task object 225C to be performed a second time in an effort to realize the change associated with the third change object 245C. Furthermore, the third change object 245C may continue to add the third task object 225C to subsequent development iteration objects until the change associated with the third change object 245C successfully undergoes testing and is deployed to the production environment 330

Figure 5:
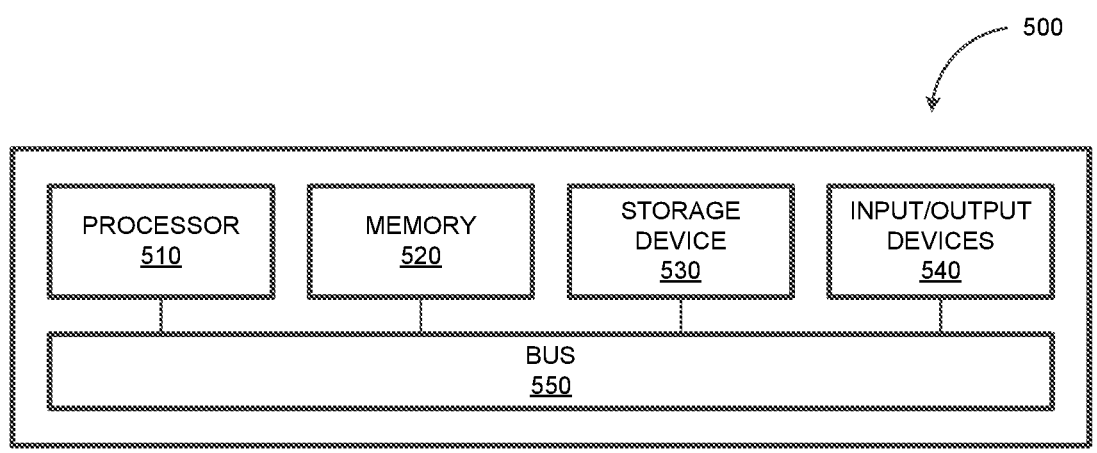
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the development tracker 110, the deployment tracker 120, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the development tracker 110 and/or the deployment tracker 120. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, comprising:
    generating a first tracking object comprising a first computer process that is executed to track a progress of deploying, to a production system, a first change to a software product, the first change to the software product implementing a feature that is being added to the software product as a part of a first update to the software product, the first change being developed by at least completing, at a development system, a first task, the first task associated with a second tracking object at the development system, and the second tracking object comprising a second computer process that is executed to at least determine when the first task developing the first change is complete;
    receiving, from the second tracking object, an indication that the first task is complete;
    in response to receiving the indication, testing, by the first tracking object, the first change; and
    in response to the first change failing to pass the testing, adding the second tracking object to a third tracking object associated with a second update to the software product, the third tracking object comprising a third computer process that is executed to track a progress of the second update, and the second tracking object being added to the third tracking object in order to add the first change to the second update to the software product such that the first task developing the first change is performed again as part of developing the second update to the software product.

2. The method of claim 1, further comprising:
    in response to the first change passing the testing, deploying, by the first tracking object, the first change to the production system.

3. The method of claim 1, wherein the first tracking object is associated with a fourth tracking object tracking a progress of implementing the feature included in the first update to the software product.

4. The method of claim 3, wherein the fourth tracking object is associated with a fifth tracking object at the development system, wherein the fifth tracking object corresponds to a task log that includes the first task, and wherein the task log further includes a second task associated with developing the first change or a second change to the software product.

5. The method of claim 4, wherein the second tracking object is associated with the fifth tracking object, and wherein the second tracking object is further configured to send, to the fifth tracking object, an indication of when the first task is complete.

6. The method of claim 5, wherein the fifth tracking object is configured to at least:

determine, based at least on the indication from the second tracking object, when every task included in the task log corresponding to the fifth tracking object is complete; and in response to a determination that every task included in the task log is complete, send, to the fourth tracking object, an indication that the feature corresponding to the fourth tracking object has been implemented.

7. The method of claim 1, wherein the testing of the first change comprises applying a test package associated with the first change, wherein the test package includes one or more tests implemented by one or more corresponding test scripts, and wherein the first change passes the testing by passing a threshold quantity of the one or more tests.

8. A system, comprising:
at least one data processor; and
at least one memory storing instructions, which when executed by the at least one data processor, cause operations comprising:
generating a first tracking object comprising a first computer process that is executed to track a progress of deploying, to a production system, a first change to a software product, the first change to the software product implementing a feature that is being added to the software product as a part of a first update to the software product, the first change being developed by at least completing, at a development system, a first task, the first task associated with a second tracking object at the development system, and the second tracking object comprising a second computer process that is executed to at least determine when the first task developing the first change is complete;
receiving, from the second tracking object, an indication that the first task is complete;
in response to receiving the indication, testing, by the first tracking object, the first change; and
in response to the first change failing to pass the testing, adding the second tracking object to a third tracking object associated with a second update to the software product, the third tracking object comprising a third computer process that is executed to track a progress of the second update, and the second tracking object being added to the third tracking object in order to add the first change to the second update to the software product such that the first task developing the first change is performed again as part of developing the second update to the software product.

9. The system of claim 8, further comprising:
in response to the first change passing the testing, deploying, by the first tracking object, the first change to the production system.

10. The system of claim 8, wherein the first tracking object is associated with a fourth tracking object tracking a progress of implementing the feature included in the first update to the software product.

11. The system of claim 10, wherein the fourth tracking object is associated with a fifth tracking object at the development system, wherein the fifth tracking object corresponds to a task log that includes the first task, and wherein the task log further includes a second task associated with developing the first change or a second change to the software product.

12. The system of claim 11, wherein the second tracking object is associated with the fifth tracking object, and wherein the second tracking object is further configured to send, to the fifth tracking object, an indication of when the first task is complete.

13. The system of claim 12, wherein the fifth tracking object is configured to at least:
determine, based at least on the indication from the second tracking object, when every task included in the task log corresponding to the fifth tracking object is complete; and
in response to a determination that every task included in the task log is complete, send, to the fourth tracking object, an indication that the feature corresponding to the fourth tracking object has been implemented.

14. The system of claim 8, wherein the testing of the first change comprises applying a test package associated with the first change, wherein the test package includes one or more tests implemented by one or more corresponding test scripts, and wherein the first change passes the testing by passing a threshold quantity of the one or more tests.

15. A non-transitory computer-readable storage medium including programming code, which when executed by at least one data processor, causes operations comprising:
generating a first tracking object comprising a first computer process that is executed to track a progress of deploying, to a production system, a first change to a software product, the first change to the software product implementing a feature that is being added to the software product as a part of a first update to the software product, the first change being developed by at least completing, at a development system, a first task, the first task associated with a second tracking object at the development system, and the second tracking object comprising a second computer process that is executed to at least determine when the first task developing the first change is complete;
receiving, from the second tracking object, an indication that the first task is complete;
in response to receiving the indication, testing, by the first tracking object, the first change; and
in response to the first change failing to pass the testing, adding the second tracking object to a third tracking object associated with a second update to the software product, the third tracking object comprising a third computer process that is executed to track a progress of the second update, and the second tracking object being added to the third tracking object in order to add the first change to the second update to the software product such that the first task developing the first change is performed again as part of developing the second update to the software product.

* * * * *